(12) United States Patent
Lebrun et al.

(10) Patent No.: US 7,867,397 B2
(45) Date of Patent: Jan. 11, 2011

(54) METHOD FOR PURIFYING WASTE WATER WITH ADDED OXIDIZING AGENT

(75) Inventors: Thierry Lebrun, Villecresne (FR); Xavier Lebosse, Rueil Malmaison (FR); Chrystelle Langlais, Le Pecq (FR)

(73) Assignee: Degremont, Rueil-Malmaison (FR)

( * ) Notice: Subject to any disclaimer, the term of this patent is extended or adjusted under 35 U.S.C. 154(b) by 0 days.

(21) Appl. No.: 12/066,002

(22) PCT Filed: Sep. 1, 2006

(86) PCT No.: PCT/FR2006/002020

§ 371 (c)(1),
(2), (4) Date: Jul. 28, 2008

(87) PCT Pub. No.: WO2007/028879

PCT Pub. Date: Mar. 15, 2007

(65) Prior Publication Data

US 2009/0114592 A1    May 7, 2009

(30) Foreign Application Priority Data

Sep. 8, 2005    (FR) .................................... 05 09180

(51) Int. Cl.
*C02F 3/00* (2006.01)

(52) U.S. Cl. ...................................... 210/604; 210/620

(58) Field of Classification Search ......... 210/620–628, 210/604
See application file for complete search history.

(56) References Cited

U.S. PATENT DOCUMENTS

| 5,458,779 | A | * | 10/1995 | Odegaard | .................... | 210/616 |
| 5,744,037 | A | * | 4/1998 | Fujimura et al. | ............ | 210/620 |
| 6,162,359 | A | * | 12/2000 | Andre et al. | ................. | 210/604 |
| 6,926,832 | B2 | * | 8/2005 | Collins et al. | ................ | 210/615 |
| 7,384,555 | B1 | * | 6/2008 | Yasui et al. | .................. | 210/605 |
| 2002/0158009 | A1 | * | 10/2002 | Khudenko | .................... | 210/605 |

FOREIGN PATENT DOCUMENTS

| DE | 195 08 786 A1 | 9/1995 |
| DE | 199 42 184 A1 | 3/2001 |
| FR | 2 843 106 A1 | 2/2004 |
| WO | WO-01 21535 A1 | 3/2001 |

* cited by examiner

*Primary Examiner*—Chester T Barry
(74) *Attorney, Agent, or Firm*—Connolly Bove Lodge & Hutz LLP

(57) ABSTRACT

The invention concerns a method for purifying wastewater loaded with organic matter, said method including: a step of contacting wastewater with a biological culture containing a purifying biomass and a step of separating performed by filtration through organic or inorganic membranes. The invention is characterized in that at least part of the biological culture is subjected to an oxidative stress step enabling a liquor to be obtained by the action of at least one oxidizing agent used in small amount so as to preserve the biological activity of the purifying biomass while modifying the microbial floc to make it denser.

7 Claims, 4 Drawing Sheets

METHOD FOR PURIFYING WASTE WATER WITH ADDED OXIDIZING AGENT

CROSS REFERENCE TO RELATED APPLICATIONS

Figure 1:
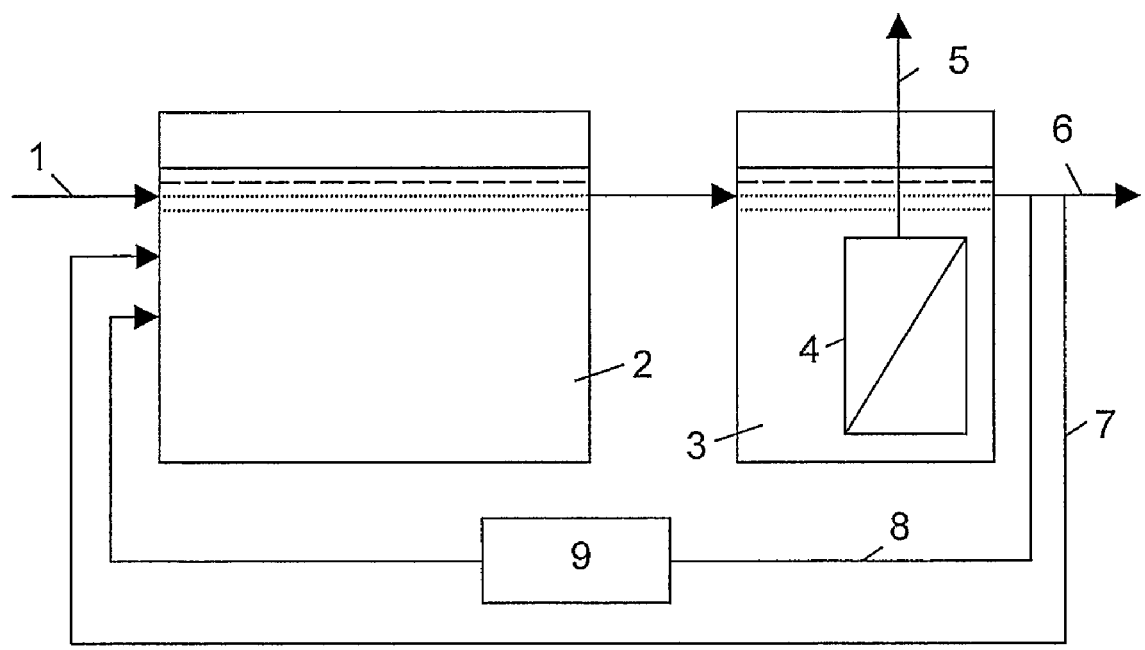

This application is a National Phase filing under 35 U.S.C. §371 of PCT/FR2006/002020 filed Sep. 1, 2006, which claims priority to Patent Application No. 0509180, filed in France on Sep. 8, 2005. The entire contents of each of the above-applications are incorporated herein by reference.

The present invention relates to methods and devices for improving the treatment of wastewater, comprising one or more biological treatment(s) associated with a liquid/solid membrane separation member so as to reduce investment costs by increasing the filterability of the biological culture and reducing the surface area of the membranes.

More specifically, the invention relates to a method for purifying wastewater of municipal or industrial origin, loaded with organic matter, said method comprising a step during which the wastewater spends time in a treatment device using a biological culture containing the purifying biomass, and the separation of which is carried out by filtration through organic or inorganic membranes (micro-, ultra-, nano- or hyperfiltration).

It is known by those skilled in the art that filtration (micro-, ultra-, nano- or hyperfiltration) membranes are sensitive to clogging, which results in initial oversizing of the membrane surface area, and in the long term, to increased running costs corresponding to the reagents used to clean said membranes. The clogging of membranes with various types of substances, in particular dissolved substances such as organic matter, colloids or substances in suspension (abbreviated to SM, suspended matter), is greatly affected by the hydraulic conditions in the vicinity of the filtration membrane, but also by the properties of the microbial floc. Clogging leads to a very substantial reduction in the filtration capacity of the membrane, the decrease not always being reversible.

It is also known ("Mémento technique de l'Eau" ["Technical Water Summary"] tome 1, chapter 3 and chapter 4.1—published by Degremont 2005) that the addition of certain reagents makes it possible to reduce membrane clogging. In particular, those skilled in the art are aware that coagulation with metal salts makes it possible to stabilize colloids, to precipitate certain organic matter after adsorption, and as a result to improve the filtration of the membrane. It is common to find, in the literature, numerous publications mentioning the use of powdered active carbon, of polymers or of other structuring agents such as glass beads which make it possible to reduce the amount of low-molecular-weight particles in the soluble phase and to thus limit the clogging phenomenon.

These phenomena may be characterized according to several approaches:
- by a laboratory coagulation-flocculation jar test with various doses of reagent, and estimation, for example, of the decanting rates,
- by measuring the zeta potential (pZ) and especially the change in said pZ as a function of the doses of added reagents, until the dose that cancels out the pZ and that therefore corresponds to the treatment rate required to obtain optimal coagulation, is determined.

These two approaches lead to the definition of a dose of coagulant or of structuring agent, referred to as "optimal coagulation dose" which, according to the experience gained by those skilled in the art, is the dose which allows the best clarifying treatment of the water being treated and which, consequently, will provide the best operating conditions for the membrane, i.e. the least fouling conditions.

However, in addition to its cost, the addition of a reagent has several drawbacks which have consequences on the running cost, which relates in particular to the management thereof, to the production of physico-chemical sludge. Furthermore, depending on the size of the mineral fraction in the excess sludge, certain beneficial channels, such as incineration and agricultural benefit, may be prohibited.

The present invention aims to provide a method for minimizing or at the very least reducing membrane clogging and improving the filtration capacity of said membranes while at the same time reinforcing the savings of the method. In order to achieve this result, the technical problems to be solved are the following:
- avoiding introducing into the treatment device metal salts, active carbon or any other structuring compound,
- notably increasing the specific production flow ($l \cdot h^{-1} \cdot m^{-2}$ of membrane),
- producing a minimum of sludge,
- reducing the surface area of membranes to be installed for treating the same volume of water.

The inventors have noted that, under specific conditions and surprisingly for those skilled in the art, the action of ozone on the activated sludge containing the purifying biomass makes it possible to significantly improve the filtration capacity of the membrane without, however, nullifying the zeta potential of the water to be treated.

Those skilled in the art are aware that oxidation with ozone is used in the wastewater treatment field for reducing the amount of sludge produced by a biological treatment. For this application, the doses of ozone applied should be sufficiently large to bring about destructuring of the microbial floc, rupturing of the bacteria and solubilization of the particulate organic matter so as to render this biodegradable.

Patent application WO 03/078335 describes such a method, in which the activated sludge is subjected to a pretreatment with ozone (dose of 0.02 g $O_3$/g solids) in combination with an alkaline and heat treatment so as to increase the "biodegradability of microorganisms" by hydrolyzing their cell wall. The principal drawback of these methods is that they release into the liquid phase a nonbiodegradable organic fraction referred to as "hard COD", which accumulates in the membrane bioreactor and the highly colloidal structure of which can contribute to fouling of the filtration membranes.

To this effect, the invention proposes a method for purifying wastewater loaded with organic matter, said method comprising a step of bringing the wastewater into contact with a biological culture containing a purifying biomass and a separation step carried out by filtration through organic or inorganic membranes, characterized in that at least part of said biological culture is subjected to an oxidative stress step enabling a liquor to be obtained by the action of ozone used in small amount, in a proportion of from 0.1 mg to 8 mg of ozone per gram of solids of the effluent to be treated, so as to preserve the biological activity of the purifying biomass while at the same time modifying the structure of the microbial floc so as to make it more dense.

For the purpose of the invention, the term "oxidative stress" is intended to mean a controlled and reduced oxidation of the effluent to be treated so as to bring about partial oxidation of the oxidizable compounds. This incomplete oxidation brings about a modification and a structuring of the sludge such that it becomes less fouling for the filtration membranes. In particular, this oxidative stress makes it possible to generate denser and harder flocs while at the same time preserving the biological activity of the purifying biomass.

Advantageously, the liquor is fed back to the principal device by recirculation.

Due to the preservation of the biological activity of the purifying biomass, it consequently becomes entirely possible to reintroduce the liquor at the head of the line, and thus to limit the addition of biomass for the biological treatments upstream of this filtration, by virtue of this re-inoculation.

Advantageously, the pH is always between 6 and 9, limits inclusive.

This characteristic itself also makes it possible to preserve the biological activity of the purifying biomass and means that the pH of the effluents and/or of the liquor does not have to be corrected before possible removal.

According to a preferred embodiment of the method according to the invention, the oxidative stress step is combined with mechanical stirring before the liquor is fed back to the principal device.

In this context, the mechanical stirring may take place before the oxidative stress step or after the oxidative stress step, or else the oxidative stress step and the mechanical stirring take place in the same reaction chamber.

Advantageously, the oxidative stress step is carried out in an oxidation reactor which comprises at least one vent from which a gaseous effluent comprising at least oxygen exits, the method also comprising a step consisting in collecting this gaseous effluent, and in reusing said gaseous effluent for treating the wastewater or another liquid resulting from the treatment of this wastewater.

The advantage of using a gaseous oxidizing agent such as ozone is typically that of generating, from the oxidative stress step, an oxygen-rich gaseous effluent which may be reintroduced at the beginning of the method so as to promote the aerobic phase of the biological treatments.

Finally, the oxidative stress step can be carried out in a reactor operating under pressure, for example, from 0.1 to 5 bar.

By virtue of these arrangements, the floc becomes larger and broad with a dense and granular structure that can be observed under a microscope. The improvement in the floc properties contributes to increasing the filterability of the biological culture.

The invention also has the advantage of reducing possible biological conditions (in particular "bulking") due to filamentous bacteria and of considerably increasing sludge decantability.

Irrespective of the dose of oxidizing agent, and in particular of ozone, the filamentous bacteria, which are detrimental to good decanting of the sludge due to their morphology, will be destroyed, thereby increasing the quality of the decantation parameter accordingly. This will bring about an improvement in the quality and in the structuring of the sludge.

Moreover, the invention contributes to producing biological sludge whose ability to be dehydrated is greatly improved both in terms of the consumption of polymer and in terms of the final dryness.

The method according to the invention gives excellent results when it is applied to membranes of various shapes (capillary, tubular, planar and spiral membranes) with an inner and outer skin, having varied configurations (in a casing, without a casing, and immersed in a tank). The invention is also suitable for applications that concern the watering of recreational areas and the reuse of wastewater in factories.

Figure 2:
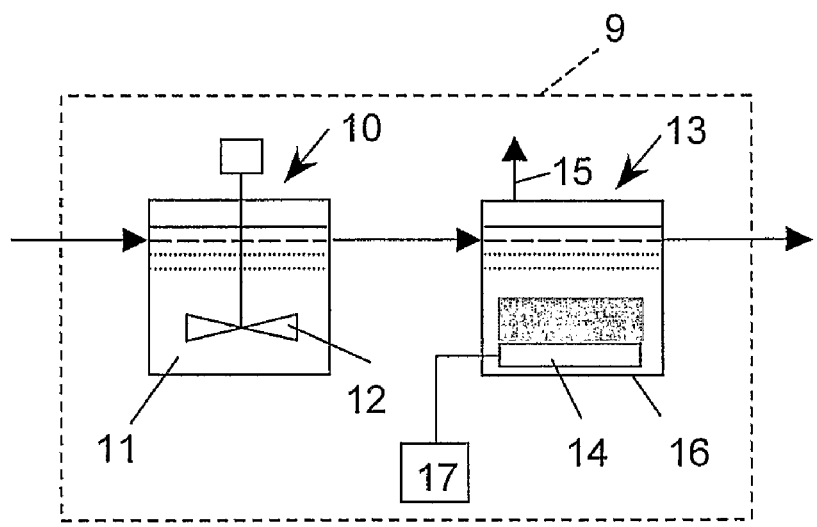
Figure 3:
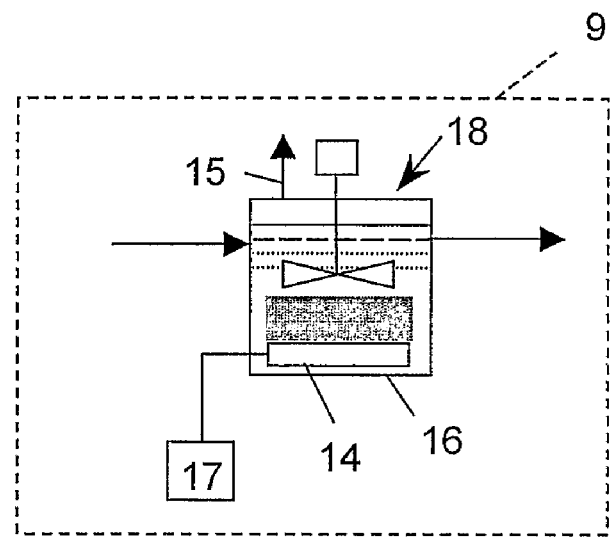
Figure 4:
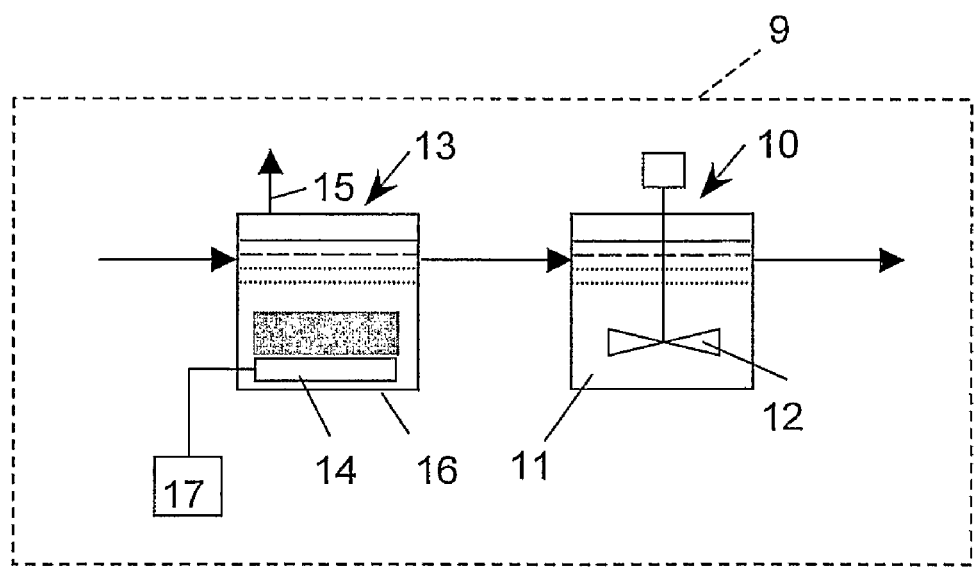
Figure 5:
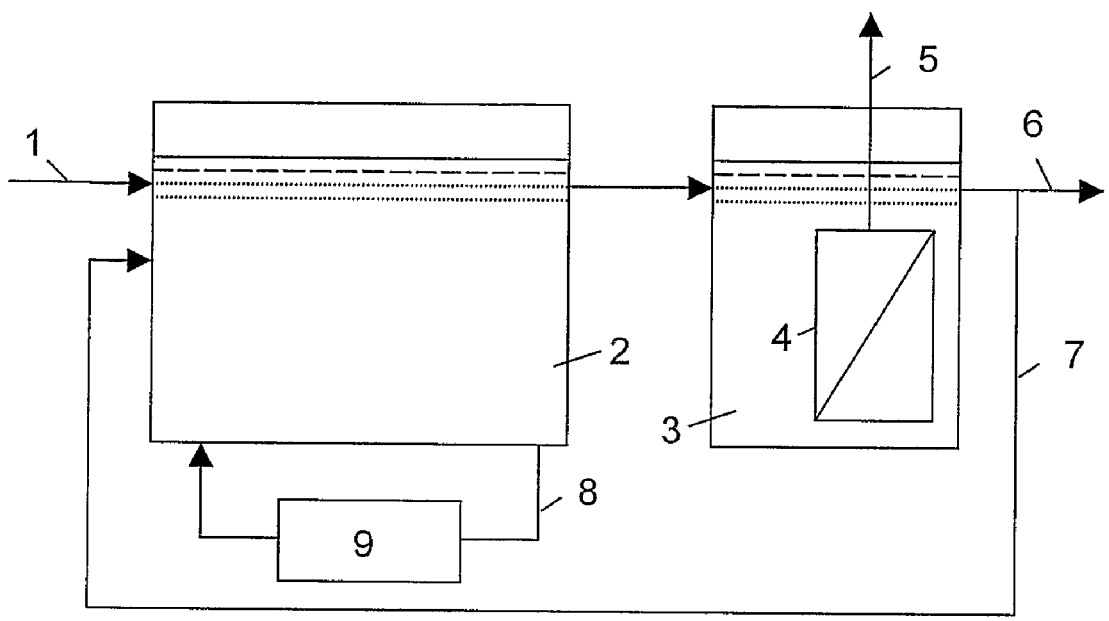
Figure 6:
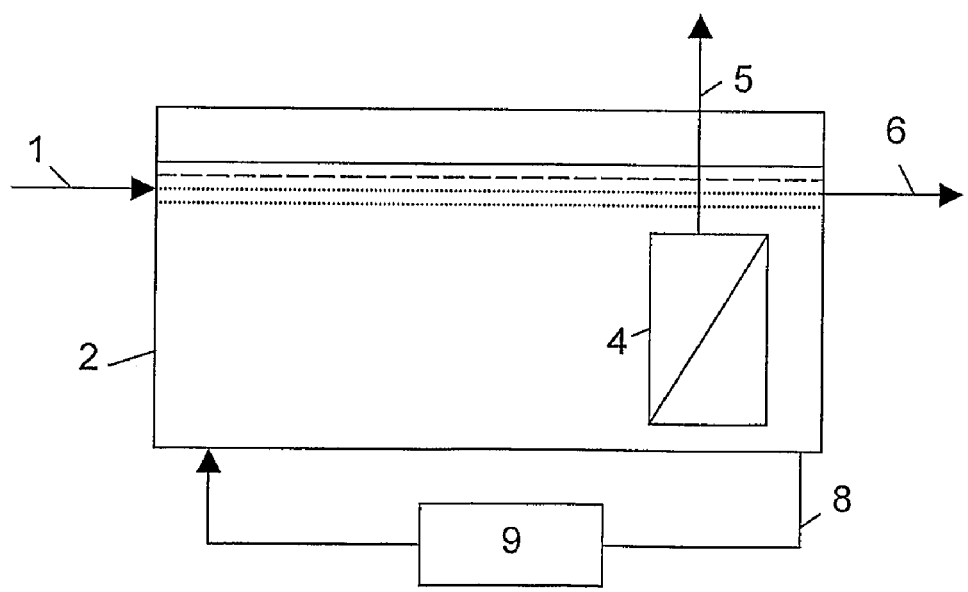
Figure 7:
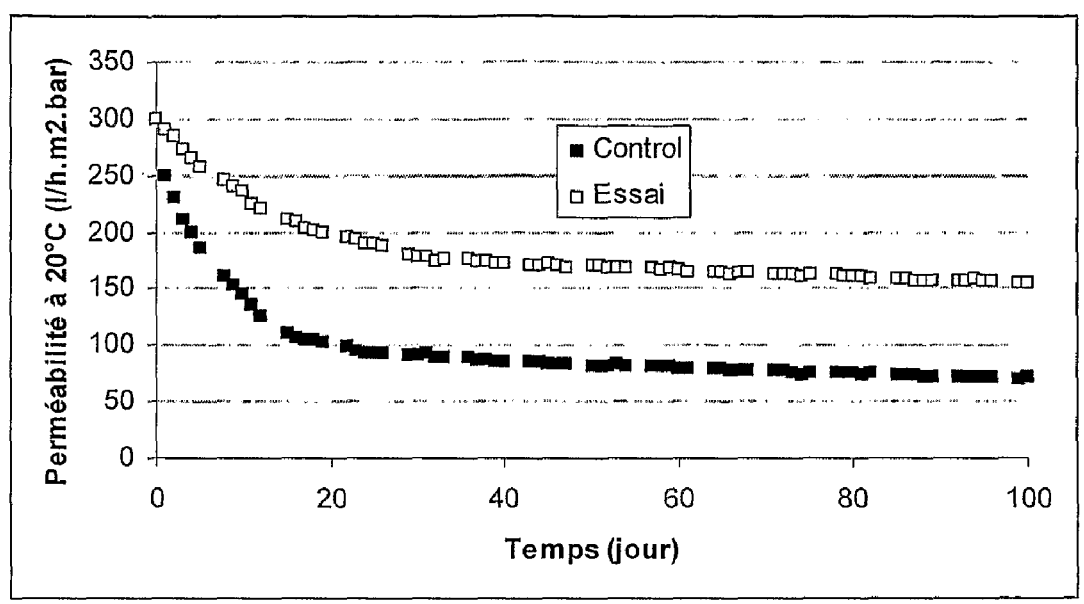

Other characteristics and advantages of the invention will emerge on reading the description given hereinafter with reference to the drawings in which:

FIG. 1 is a schematic view of a water treatment plant equipped with a membrane and implementing a method according to various embodiments of the invention, FIGS. 2 to 4 are schematic views showing in greater detail the content of the device 9 of FIG. 1, in which the combined treatment of oxidation and of mechanical stirring of the effluent to be treated is implemented, FIGS. 5 and 6 are views similar to FIG. 1, for another embodiment of the invention, and FIG. 7 shows the change in membrane permeability as a function of time for a conventional method and a method according to the invention.

FIG. 1 represents very schematically a wastewater purification station comprising:
  an inlet 1 for wastewater loaded with organic matter,
  one or more biological treatment reactors, for example, a tank 2 in which said organic matter is degraded by the purifying biomass, producing sludge,
  a filtration tank 3 harbors filtration membranes 4 which make it possible to separate the liquid phase from the solid phase,
  a treated water outlet 5 which collects the filtered water at the outlet of the filtration through the membranes 4,
  an evacuation of the sludge produced at 6,
  a first recycling loop 7 which collects part of the sludge at the evacuation 6 and which recycles the sludge to the head of the aeration tank 2, it being possible for this first recycling loop to be, where appropriate, eliminated (this recycling loop may, for example, ensure a flow rate representing from 50% to 400% of the nominal flow rate of municipal or industrial effluent treated by the purification station), and
  a second loop 8 for converting the activated sludge, which also collects part of the sludge at the evacuation 6 and which feeds this sludge back to the head of the aeration tank 2 after it has passed through a sludge treatment assembly in which said sludge undergoes a combined treatment of oxidation with ozone and/or with oxygen and of mechanical stirring.

As represented in FIG. 2, the oxidation and mechanical stirring device 9, in order to carry out the oxidative stress step in accordance with the method according to the invention, comprises a mechanical stirrer 10 generally consisting of a chamber 11 comprising one or more turbines 12 or optionally dynamic mixers or hydroejectors, etc. or any other mechanical stirring system. The power of the mechanical stirring system is chosen in such a way that the sludge treatment assembly 9 dissipates a mechanical stirring energy.

Furthermore, the oxidation and mechanical stirring device 9 comprises an oxidation reactor 13 which generally consists of a closed chamber 16 which receives the sludge to be treated and into which ozone originating from an ozonizer 17 is injected by means of injection nozzles 14 (optionally replaced with porous diffusers, hydroejectors, or the like), these nozzles being coupled, where appropriate, to static or dynamic mixers.

The ozonation consumes, overall, from 0.1 mg to 10 mg of ozone per g of solids contained in the treated sludge which passes through the device 9 for converting the activated sludge.

The chamber 16 may be pressurized, and, in this case, is the subject of appropriate structural calculations. Furthermore, this chamber 16 has a vent 15 from which a gaseous effluent comprising at least oxygen exits, and can be reused at any point of the purification station, for example, at the head of the aeration tank.

Moreover, the mechanical stirrer 10 and the oxidation reactor 13 are not necessarily arranged as in FIG. 2; as represented in FIGS. 3 and 4, it is possible:

to arrange the oxidation reactor upstream of the mechanical stirrer (see, more particularly, FIG. 4);

to arrange the turbine 12 or other stirring system in the oxidation reactor 18 itself (FIG. 3), this reactor having, moreover, characteristics similar to the oxidation reactor 13 described above.

Finally, as represented in FIGS. 5 and 6, the sludge treatment assembly 9 with all its variants described above can optionally take the sludge from the aeration tank 2 and feed the treated sludge back to the same aeration tank.

More generally, the sludge treatment assembly 9 can take a sample of the sludge to be treated at any place in the purification station after at least one biological treatment of the wastewater, and feed at least part of the treated sludge back to this biological treatment.

An example of implementation with figures is described hereinafter so as to reveal the technical effects and advantages provided by the present invention.

EXAMPLE

A trial was carried out on two identical treatment systems using a bioreactor containing a concentrated activated sludge at 10 g/l with respect to SM, in which were immersed polyvinylidene fluoride (PVDF) membranes having pores of 0.035 microns and a total surface area of 0.93 m$^2$, fed with the same raw water, residual municipal water, one of the treatment systems operating in accordance with the invention. The oxidation device in which the oxidation stress step takes place was composed of a reactor equipped with a mechanical stirring system into which were introduced the effluent to be treated, originating from the bioreactor, and the ozone produced from pure oxygen. The dose of ozone used for this trial was 3 mg of ozone per g of solids contained in the effluent to be treated.

The operating conditions for the membrane were:
Flow: 40 l/h m$^2$ to 20° C.
Cycle time: 15 minutes
Backwashing time: 30 seconds
Backwashing flow: 1.35× filtration flow.

FIG. 7 shows the change in membrane permeability as a function of time for the two systems.

In this example, the permeability of the membrane of the control line is 71 l/h·m$^2$·bar after 100 days of operation, versus 154 l/h·m$^2$·bar for the line equipped according to the invention.

The improvement in the filterability of the activated sludge is also demonstrated with the capillary suction time, or CST, measurements. The value obtained on the activated sludge of the equipped treatment system according to the invention is more than two times lower.

|     | Control | Trial |
| --- | --- | --- |
| CST | 47 s | 28 s |

Moreover, the production of sludge was reduced by 10% and the sludge index was significantly improved: 140 ml/g for the control line versus 76 ml/g for the equipped line according to the invention.

It is clear that the experiment reported above and the results that it makes it possible to obtain go against the experience of the teaching of the prior art. In fact:

the improvement in the filterability of the biological culture without the addition of metal salts or of structuring reagents such as powdered active carbon, polymers or glass beads, by modification of the structure of the microbial floc, subjected to an oxidative stress, and the use of a powerful oxidizing agent such as ozone at a dose sufficiently low not to rupture the bacteria which make up the purifying biomass, are in complete contradiction to the commonly accepted routines for using membranes.

The invention claimed is:

1. A method for purifying wastewater loaded with organic matter, said method comprising a step of bringing the wastewater into contact with a biological culture containing a purifying biomass and a separation step carried out by filtration through organic or inorganic membranes, wherein at least part of said biological culture is subjected to an oxidative stress step enabling a liquor to be obtained by the action of ozone used in small amount, in a proportion of from 0.1 mg to 8 mg of ozone per gram of solids of the effluent to be treated, so as to preserve the biological activity of the purifying biomass while at the same time modifying the structure of the microbial floc so as to make it more dense, and wherein the pH is always between 6 and 9, limits inclusive.

2. A method for purifying wastewater loaded with organic matter, said method comprising a step of bringing the wastewater into contact with a biological culture containing a purifying biomass and a separation step carried out by filtration through organic or inorganic membranes, wherein at least part of said biological culture is subjected to an oxidative stress step enabling a liquor to be obtained by the action of ozone used in small amount, in a proportion of from 0.1 mg to 8 mg of ozone per gram of solids of the effluent to be treated, so as to preserve the biological activity of the purifying biomass while at the same time modifying the structure of the microbial floc so as to make it more dense, and wherein the oxidative stress step is combined with mechanical stirring before the liquor is fed back to a processing device, and further wherein the mechanical stirring takes place after the oxidative stress step.

3. The method as claimed in claim 1, together with the step of recirculating the liquor.

4. The method as claimed in claim 2 wherein the mechanical stirring takes place before the oxidative stress step.

5. The method as claimed in claim 2 wherein the oxidative stress step and the mechanical stirring take place in the same reaction chamber.

6. The method as claimed in claim 2 wherein the oxidative stress step is carried out in an oxidation reactor which comprises at least one vent from which a gaseous effluent comprising at least oxygen exits, the method also comprising a step consisting in collecting this gaseous effluent, and in reusing said gaseous effluent for treating the wastewater or another liquid resulting from the treatment of this wastewater.

7. The method as claimed in claim 2 wherein the oxidative stress step is carried out in a reactor operating under a pressure of 0.1 to 5 bar.

* * * * *